US007007894B1

(12) United States Patent
Takacs et al.

(10) Patent No.: US 7,007,894 B1
(45) Date of Patent: Mar. 7, 2006

(54) IN-FLIGHT REFUELING SYSTEM, DAMPING DEVICE AND METHOD FOR PREVENTING OSCILLATIONS IN IN-FLIGHT REFUELING SYSTEM COMPONENTS

(75) Inventors: John F. Takacs, Long Beach, CA (US); Stephen M. Stecko, Fullerton, CA (US)

(73) Assignee: The Boeing Company, Chicago, IL (US)

(*) Notice: Subject to any disclaimer, the term of this patent is extended or adjusted under 35 U.S.C. 154(b) by 87 days.

(21) Appl. No.: 10/945,602

(22) Filed: Sep. 21, 2004

(51) Int. Cl.
*B64D 39/04* (2006.01)

(52) U.S. Cl. ............... 244/135 A; 141/382; 188/266.7; 114/230.21; 114/213; 138/26; 138/127

(58) Field of Classification Search ............ 244/135 A, 244/3, 170; 188/266.7, 378; 114/213–216, 114/230.1, 230.3; 141/382, 387, 388; 137/355.12, 137/899.2, 615, 355.16–355.25; 138/26, 138/127
See application file for complete search history.

(56) References Cited

U.S. PATENT DOCUMENTS 1,818,138 A * 8/1931 Howland ....................... 244/3
2,839,021 A * 6/1958 Patterson, Jr. ......... 114/230.21
2,852,216 A * 9/1958 Peters .................... 244/135 A
2,954,190 A * 9/1960 Le Clair ................. 244/135 A
3,980,038 A * 9/1976 Dashew et al. ........ 114/230.21
4,241,763 A * 12/1980 Antal et al. ................. 138/127
4,975,543 A * 12/1990 Saunders ....................... 244/3
5,158,162 A * 10/1992 Fink et al. .................. 188/378
6,082,719 A * 7/2000 Shtarkman et al. ...... 188/266.7
2003/0212333 A1* 11/2003 Rabiner et al. ............. 600/462
2004/0195060 A1* 10/2004 Jovovic et al. .......... 188/266.7
2005/0045768 A1* 3/2005 Saggio et al. ........... 244/135 A

* cited by examiner

*Primary Examiner*—Galen Barefoot
(74) *Attorney, Agent, or Firm*—Alston & Bird LLP

(57) ABSTRACT

An in-flight refueling system, damping device and method are provided for enhancing the stability of an elongate hose extending from a tanker aircraft during an in-flight refueling operation. The various embodiments of the system, device, and method provide a passive, integrated damping device that may generate electrical energy from changes in disposition of the elongate hose and then using the electrical energy generated to impart mechanical damping forces to a portion of the elongate hose. Thus, the embodiments may minimize the occurrence of oscillations in the elongate hose as it extends from the tanker aircraft during an in-flight refueling operation.

18 Claims, 2 Drawing Sheets

IN-FLIGHT REFUELING SYSTEM, DAMPING DEVICE AND METHOD FOR PREVENTING OSCILLATIONS IN IN-FLIGHT REFUELING SYSTEM COMPONENTS

FIELD OF THE INVENTION

The present invention relates generally to in-flight refueling of a manned or unmanned aircraft using a probe and drogue in-flight refueling system, and specifically, providing a damping device having the capability of resisting changes in the disposition of an elongate hose trailing from a tanker aircraft as part of an in-flight refueling operation so as to prevent oscillatory motion or other changes in disposition of the elongate hose. More particularly the present invention relates to an integrated, passive damping device operably engaged with the elongate hose so as to stabilize the elongate hose as it is extended from a tanker aircraft as part of an in-flight refueling operation.

BACKGROUND OF THE INVENTION

In-flight refueling (or air-to-air refueling) is an important method for extending the range of both manned and unmanned aircraft traveling long distances over areas having no feasible landing or refueling points. Although in-flight refueling is a relatively common operation, especially for military aircraft, the passage of large amounts of fuel between a first aircraft (the tanker aircraft, for instance) and a second aircraft (the receiver aircraft, for instance) during an in-flight refueling operation may create a potentially dangerous situation, especially if components of the in-flight refueling system are allowed to move or oscillate in an uncontrolled manner. In addition, the close proximity of the first aircraft and the second aircraft during an in-flight refueling operation may create the danger of a mid-air collision between the aircraft. Such a danger may be increased if a component of an in-flight refueling system extending from the first aircraft is allowed to oscillate or move in an erratic manner relative to the first aircraft.

One conventional system for in-flight refueling is the probe and drogue in-flight refueling system wherein the first aircraft may extend an elongate flexible hose having an end attached to a drogue such that the second aircraft, having a refueling probe extending therefrom, may engage the drogue while in flight in order to initiate the transfer of fuel. An operator of the second aircraft is responsible for maneuvering the second aircraft such that the refueling probe extending therefrom may enter and engage the drogue. According to some conventional probe and drogue in-flight refueling systems, the engagement of the refueling probe with the drogue is accomplished as the second aircraft carefully accelerates with respect to the trailing drogue. The drogue may include, for instance, a catch mechanism for securing the refueling probe within the drogue so that the refueling probe may be securely fastened within the drogue during the transfer of fuel. The catch mechanism may also include a fuel valve that may be opened when the probe is secured within the drogue. Thus, fuel may be pumped from the first aircraft into the elongate hose and down to the fuel valve disposed in the drogue so as to pressurize the elongate hose prior to the engagement of the probe carried by the second aircraft.

The elongate hose extending from the first aircraft may trail directly aft and below a fuselage of the first aircraft, or, in some instances, it may trail directly aft and below a refueling pod that may be carried by the first aircraft on, for instance, a wing hardpoint. In both of these cases, the elongate hose may be exposed to high wind speeds as it is trailed behind the first aircraft. For instance, the first aircraft may travel at speeds between about 180 and 400 knots during a conventional in-flight refueling operation. During an in-flight refueling operation using a probe and drogue in-flight refueling system, the elongate hose may trail aft and below the first aircraft in a stable arc such that the drogue operably engaged with the end of the elongate hose may be held in a relatively stable position relative to the first aircraft. In such cases, an operator of the second aircraft may position the second aircraft such that a refueling probe extending therefrom may engage the relatively stable drogue.

As in all mechanical systems, however, the elongate hose and attached drogue may experience oscillatory vibrations in response to applied forces (such as for instance, wind forces, or the impact force encountered as the second aircraft engages the drogue). In some cases, the elongate hose (and attached drogue) may begin to oscillate uncontrollably (at for instance, a resonance frequency) with respect to the first aircraft such that the drogue may move in an erratic pattern with respect to the first aircraft such that it may become difficult for an operator of the second aircraft to maneuver the second aircraft such that the refueling probe extending therefrom may be engaged with the drogue. In such cases, the elongate hose, may, for instance, rise into an upward arc relative to the first aircraft and/or oscillate relative to the first aircraft. Such motion may not only make the in-flight refueling operation difficult but also endanger both the first and second aircraft if the motion becomes extreme. In addition, if the second aircraft engages the drogue at a relatively high closure rate, slack may be introduced in the elongate hose and a traveling wave (such as a sinusoid or "sine" wave) may be propagated in the elongate hose that may travel from the drogue to the tanker aircraft (or the in-flight refueling system pod carried thereby). The safety of the crews that may operate the first and second aircraft may be in danger if the elongate hose and attached drogue begin to impact the control surfaces, in-flight refueling system pod, or other structural components of the first or second aircraft.

In such cases, conventional probe and drogue in-flight refueling systems may provide an elongate hose retraction system disposed, for instance, in the fuselage of the first aircraft, for stabilizing the hose with respect to the first aircraft. More particularly, the retraction system may act to take up excess slack in the elongate hose in order to shorten the extension of the elongate hose in an attempt to dampen the oscillation of the elongate hose. If such a retraction system is used, however, the elongate hose may be drawn away from the second aircraft such that the in-flight refueling operation must be restarted wherein the first aircraft must re-extend the elongate hose and the second aircraft must re-position itself relative to the elongate hose and drogue attached to an end thereof. Additionally, simply taking up slack in the hose may not ensure that the oscillations in the elongate hose will not reappear when the elongate hose is re-extended. Additionally, suspending the in-flight refueling operation in order to retract and re-extend the elongate hose may be disadvantageous especially in cases wherein the second aircraft is carrying only a minimal amount of fuel and is therefore in need of an expeditious in-flight refueling contact.

Conventional probe and drogue in-flight refueling systems may also provide a guillotine system for cutting and jettisoning the elongate hose should oscillations or movement of the elongate hose and attached drogue become erratic enough so as to endanger the operators and/or other crew of either the first or second aircraft. However, it is undesirable to jettison the elongate hose and attached drogue as the first aircraft must cease in-flight refueling operations and return to an airfield for costly and complex repairs to the in-flight refueling system.

Therefore, there exists a need for an in-flight refueling system and method for damping oscillations and preventing changes in disposition that may occur in probe and drogue in-flight refueling system components, such as for instance, an elongate hose trailing aft and below a first aircraft (serving as, for instance, a tanker aircraft). More particularly, there exists a need for a passive, integrated damping device that may selectively and/or responsively add rigidity to the elongate hose in order to dampen oscillations in the elongate hose to enhance the stability of a portion of the elongate hose as it is trailed below and aft of the tanker aircraft as part of an in-flight refueling operation.

Thus, it would be advantageous to provide an alternative in-flight refueling system, damping device, and method for damping oscillations or changes in the disposition of the elongate hose and attached drogue that may occur during an in-flight refueling operation. Also, it would be advantageous to provide a device for damping oscillation of the elongate hose and attached drogue that is passive and may be integrated into the elongate hose and other in-flight refueling system components.

SUMMARY OF THE INVENTION

The embodiments of the present invention satisfy the needs listed above and provide other advantages as described below. The in-flight refueling system, according to one embodiment, includes a tanker aircraft, an elongate hose having a first end carried by the tanker aircraft and an opposing second end configured to extend from the tanker aircraft, and a damping device operably engaged with a portion of the elongate hose and capable of stiffening in response to a change in disposition of the elongate hose (such as an oscillation or vibration), thereby resisting the change in disposition of the elongate hose and stabilizing the elongate hose such that the elongate hose may be more easily engaged by a second aircraft as part of an in-flight refueling operation.

According to other embodiments, the damping device of the present invention may further comprise a transducer capable of generating electrical energy in response to the change in disposition. Furthermore, the damping device may further comprise a stiffening element capable of converting the generated electrical energy into a damping force to be exerted on the portion of the elongate hose so as to resist the change in disposition of the portion of the elongate hose. The damping device may comprise materials selected for their ability to generate electrical energy in response to vibration, oscillation, or other changes in disposition such as piezoelectric materials, polyvinylidene fluoride (PVDF); and other materials suitable for generating electrical energy that may be used to subsequently energize the damping device to produce a damping force that may act to stiffen the damping device and/or resist changes in disposition of the elongate hose. In some embodiments, the damping device may be integrated directly into the materials of the elongate hose. The in-flight refueling system according to some embodiments of the present invention, may also further comprise a controller device capable of storing the electrical energy generated by the materials of the damping device and transmitting the generated electrical energy back into the damping device such that the damping device is capable of exerting the damping force on the elongate hose in a controlled manner.

The embodiments of the present invention also provide a method for facilitating the stabilization of an elongate hose having a first end carried by a tanker aircraft and an opposing second end configured to extend from the tanker aircraft. For instance, according to some embodiments, the method comprises the steps of detecting a change in disposition of a portion of the elongate hose and stiffening the portion of the elongate hose in response to the detected change in disposition so as to resist the change in disposition of the portion of the elongate hose in response to the exerted force. According to other embodiments of the method of the present invention, the detecting step may comprise generating electrical energy from the change in disposition of the portion of the elongate hose and the stiffening step may comprise converting the generated electrical energy into a damping force to be exerted on the portion of the elongate hose so as to resist the change in disposition of the portion of the elongate hose.

Thus the various embodiments of the in-flight refueling system, damping device, and method of the present invention provide many advantages that may include, but are not limited to: providing an in-flight refueling system that may resist changes in the disposition of an end of the elongate hose trailing from a tanker aircraft during an in-flight refueling operation, providing a damping device that is capable of stiffening in response to the application of electrical energy that it generates in response to a change in disposition of the elongate hose and thereby passively prevent oscillations that may occur in the elongate hose due to wind or other aerodynamic forces exerted on the elongate hose and a drogue attached thereto, and providing a damping device that may be passively integrated into existing in-flight refueling systems without adding large amounts of weight or the need for additional power to be provided for its operation.

These advantages and others that will be evident to those skilled in the art are provided in the in-flight refueling system, damping device, and method of the present invention.

BRIEF DESCRIPTION OF THE DRAWINGS

Figure 1:
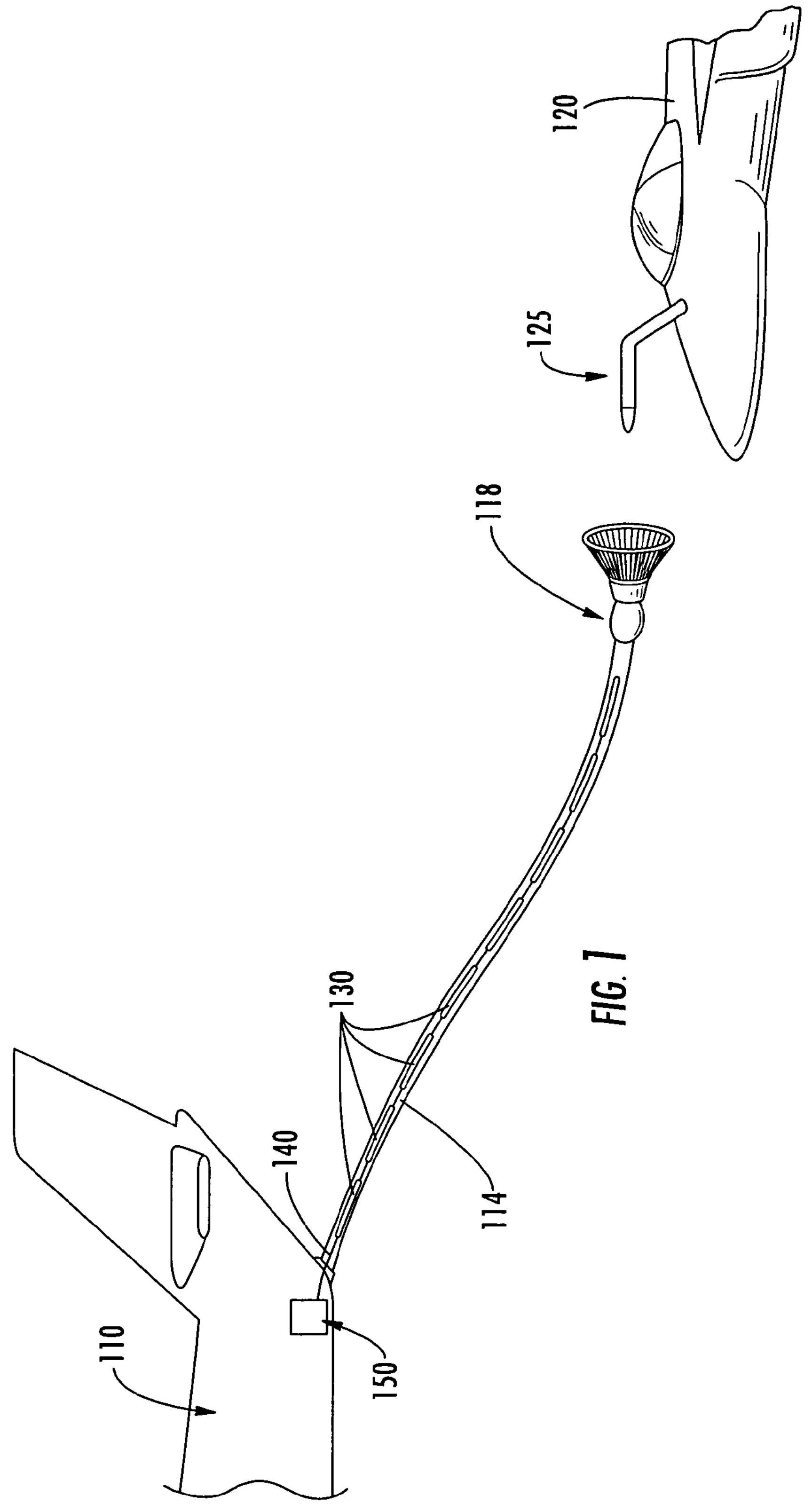
Figure 2:
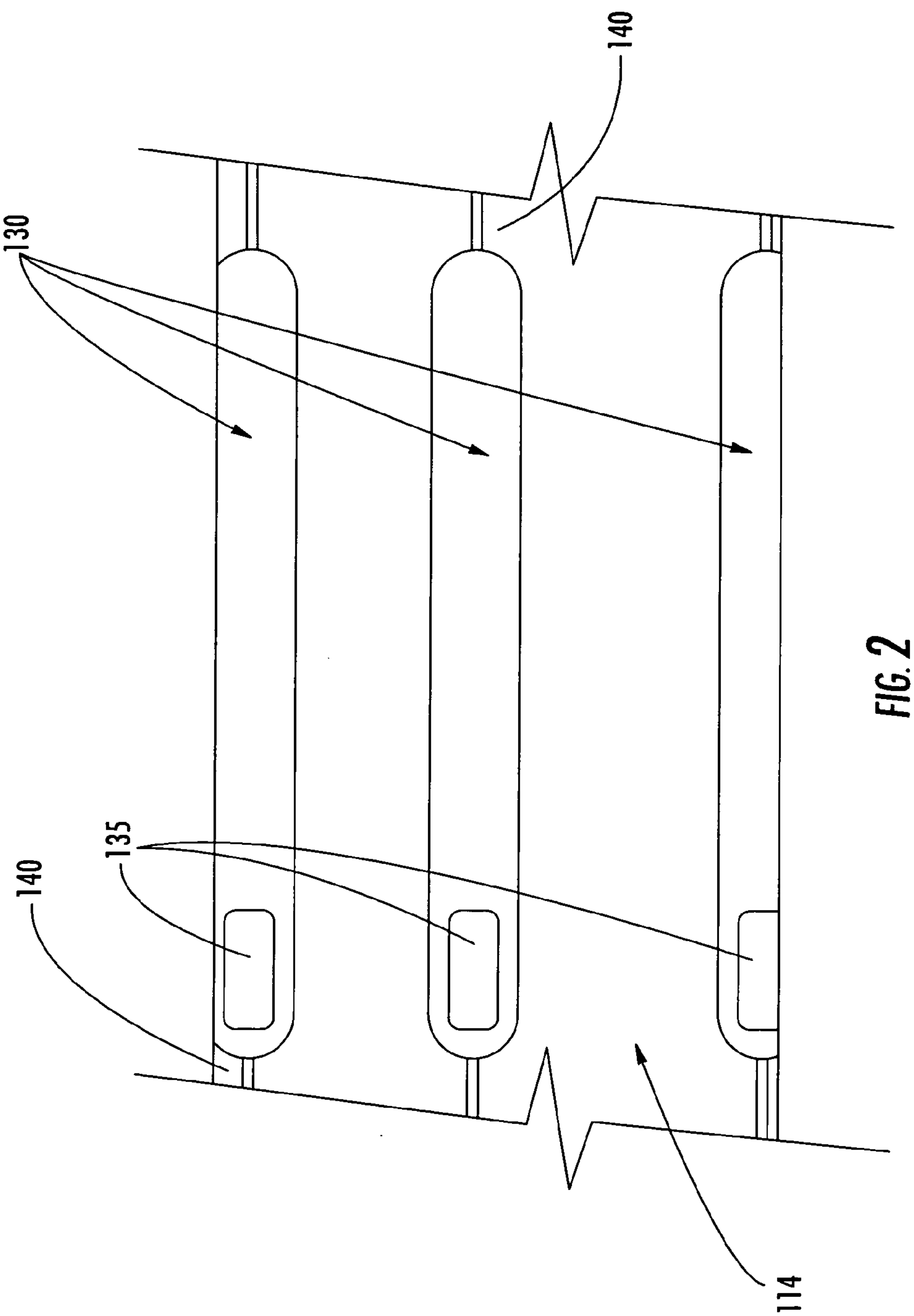

Having thus described the invention in general terms, reference will now be made to the accompanying drawings, which are not necessarily drawn to scale, and wherein:

FIG. 1 shows a side view of a tanker aircraft and an elongate hose and attached drogue extending therefrom and including a damping device according to one embodiment of the present invention; and FIG. 2 shows a schematic close-up of several damping devices and associated control circuits operably engaged with a portion of an elongate hose according to one embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIG. 1 shows an in-flight refueling system according to one embodiment of the present invention including a tanker aircraft 110 and an elongate hose 114 extending therefrom. The elongate hose 114 comprises a first end (not shown) that is carried by the tanker aircraft 110 and may be operably engaged with a fuel reservoir located within a fuselage, wing structure, or other internal compartment within the tanker aircraft 110. In some embodiments, the first end of the elongate hose 114 may further be operably engaged with a refueling pod (not shown) that may be configured to be carried by a hardpoint located, for instance, on a portion of a wing of the tanker aircraft 110. Furthermore, the elongate hose 114 may be configured to be capable of being taken up from an extended position and rolled up on, for instance, a rotating drum assembly that may be disposed within a fuselage of the tanker aircraft 110 or within a refueling pod carried on a wing hardpoint of the tanker aircraft 110. Also shown in FIG. 1 is the second end of the elongate hose 114 extending aft and below the tanker aircraft 110 and operably engaged with a drogue 118. The elongate hose 114 and drogue 118 attached thereto are thus positioned so as to be capable of being engaged by, for instance, a refueling probe 125, carried by a second aircraft 120 which may approach the tanker aircraft 110 from the aft and below as part of an in-flight refueling operation.

FIG. 1 also shows a plurality of damping devices 130 according to one embodiment of the present invention, operably engaged with the elongate hose 114. In the depicted embodiment, the damping devices 130 are shown integrated with a surface of the elongate hose 114 along the length of the elongate hose that is extending from the tanker aircraft 110. In such embodiments, the damping devices 130 may be configured to be capable of stiffening in response to changes in disposition of the elongate hose 114. Thus, the elongate hose 114 may more effectively resist oscillations and/or changes in disposition when subjected to external forces such as, for instance, aerodynamic forces, wind forces, or impact forces resulting from the engagement of the refueling receptacle 125 of a second aircraft 120 with the drogue 118. Furthermore, the damping devices 130 may act to stiffen and/or actuate so as to dampen and/or resist a change in disposition of the second end of the elongate hose 114 in response to an aerodynamic force (such as wind, wind shears, jet wash, or other disturbances that may be encountered when the elongate hose 114 is extended from the tanker aircraft 110 during the course of an in-flight refueling operation). The stiffened damping device 130 may also aid in stabilizing the position of the elongate hose 114 (and the drogue 118 attached thereto) by creating additional inertia in the elongate hose 114 such that the aerodynamic disturbances produced in the area ahead of a second aircraft 120 (known in some instances as a "bow wave") may be less likely to push the elongate hose 114 and drogue 118 forward as the second aircraft 120 approaches the tanker aircraft 110 as part of an in-flight refueling operation.

The damping devices 130 may be capable of operably engaging the elongate hose 114 in a variety of dispositions such as, for instance, attached above, below, or on one or more sides of the elongate hose 114. In addition, a single damping device 130 or multiple damping devices 130 may be disposed at one or more positions along the length of the elongate hose 114 so as to distribute the stiffening capability to such positions when the damping device 130 is subjected to the changes in disposition that may cause the damping device 130 to stiffen. Furthermore (as shown in FIG. 2), a single damping device 130 or multiple damping devices 130 may be disposed at one or more positions about the radially outward surface of the elongate hose 114 so as to distribute the stiffening capability to such positions when the damping device 130 is subjected to changes in disposition. One skilled in the art will appreciate that the damping devices 130 may also be disposed on or within the elongate hose 114 in various configurations both integrated within the elongate hose 114 and/or disposed on the surface of the elongate hose 114 so as to more completely distribute the stiffening capability when the damping device 130 is subjected to the changes in disposition.

As shown in FIG. 2, the damping device 130 may comprise a transducer, disposed lengthwise along a surface (or integrated within the materials) of a portion the elongate hose 114. According to embodiments of the present invention, the transducer is capable of generating electrical energy in response to the change in disposition of the elongate hose 114 (such as, for instance, a traveling wave, vibration, or oscillation). The damping device 130 may further comprise a stiffening element capable of converting the generated electrical energy into a damping force to be exerted on the portion of the elongate hose 114 so as to resist the change in disposition of the portion of the elongate hose 114. According to some embodiments, the damping device 130 may comprise one or more piezoelectric materials, such as for instance, piezoelectric fibers, piezoelectric crystal or polyvinylidene fluoride (PVDF) that may act as transducers suitable for both generating electrical energy (in the form of, for instance, a time-varying electrical signal) in response to the change in disposition of the elongate hose 114 as well as stiffening elements suitable for altering their mechanical properties (stiffening, for example) in response to an input that may be provided by either an external controller 150 (see FIG. 1), or a control circuit 135 that may be operably engaged with or in electrical communication with, the damping device 130. In some embodiments, the piezoelectric materials may be integrated into a composite structural material such as a sheath configured to substantially surround the elongate hose 114 and thereby distribute both the sensing and actuation capability of the piezoelectric materials about the surface of the elongate hose 114.

In some embodiments of the damping device 130 comprising piezoelectric materials, the piezoelectric materials may serve as a transducer configured to generate electrical energy (in the form of a time-varying electrical signal, for instance) in response to and corresponding to a change in the disposition of the elongate hose 114. Such a time-varying electrical signal may then be transmitted (via a wire 140 or wireless connection) to a control circuit 135 (such as a timer circuit, clock circuit, inverter circuit, or similar control circuit) that may be configured to alter the signal (such as by imparting a phase shift to the signal). The control circuit 135 may be further configured to send the altered signal back to the damping device 130 (and the piezoelectric material therein) so as to induce motion in the piezoelectric material. The resulting motion induced in the piezoelectric material may be substantially out of phase with the change in disposition of the elongate hose 114 such that an oscillatory change in disposition of the elongate hose 114 may be cancelled and/or damped by the induced motion of the piezoelectric materials. In such embodiments, a single piezoelectric crystal disposed within the damping device 130 may serve both as a transducer and a stiffening element such that it may: detect the change in disposition of the elongate hose 114; produce an electrical signal that may be sent to and altered by a control circuit 135 operably engaged with the damping device 130; and receive the altered electrical signal from the control circuit 135 and either stiffening or imparting a motion that is out of phase with the change in disposition so as to effectively dampen the change in disposition of the portion of the elongate hose 114. In other embodiments, the piezoelectric material disposed within the damping device may be segmented so as to contain a transducer portion configured to produce an electrical signal in response to a change in disposition of the elongate hose 114 as well as a stiffening portion configured to stiffen in response to either the electrical signal produced by the transducer portion (acting in substantially real time) or the altered electrical signal that may be transmitted by a control circuit 135 operably engaged with the damping device 130.

According to other embodiments of the damping device 130, the control circuit 135 may be configured to transmit a substantially non-time-varying electrical signal to the piezoelectric material (or other stiffening element) so as to induce the piezoelectric material to stiffen substantially in response to the signal. In such embodiments, the portion of the elongate hose 114 with which the damping device 130 may be operably engaged may be substantially more resistant to changes in disposition due to the increased stiffness introduced into the elongate hose 114 by the damping device 130. Furthermore, as the change in disposition of the portion of the elongate hose 114 ceases, the control circuit 135 may be configured to cease the generation of the signal such that the piezoelectric material disposed in the damping device 130 may substantially relax such that the elongate hose 114 may again attain flexibility so as to be capable of being flattened, rolled, and/or taken up by a hose take-up system (such as a roller drum) that may be carried by the tanker aircraft 110 or carried by a refueling pod configured to be carried by the tanker aircraft 110.

In some embodiments of the present invention, multiple damping devices 130 may be operably engaged with the elongate hose 114 along its length and at various radial positions about an exterior surface of the elongate hose 114 (as shown in FIG. 2). In such embodiments, the damping devices 130 may be in communication with each other via, for instance, electrical connections that may be established via wire 140 or wireless techniques. In such embodiments, the damping devices 130 may be configured to transmit and receive data related to detected changes in disposition of portions of the elongate hose 114 that may be in the form of electrical signals generated by the piezoelectric materials that may be disposed within the damping devices 130. For example, in some embodiments, a change in disposition of the elongate hose 114 may be detected by a damping device 130 (and a corresponding control circuit 135 (as shown generally in FIG. 2) operably engaged with a portion of the elongate hose 114 located near the drogue 118. The change in disposition detected by the damping device 130 may be used to generate an electrical signal (via, for instance, the piezoelectric material disposed therein) that may be transmitted, via wire 140 or wireless techniques to a second damping device 130 (and corresponding control circuit 135 operably engaged with another portion of the elongate hose 114 (such as a portion located nearer the tanker aircraft 110). Thus, the electrical signal may be generated by a first damping device 130 and transmitted to a second damping device 130 such that a change in disposition (such as a traveling wave) of the elongate hose 114 may be detected at one point along the length of the elongate hose 114 and substantially damped and/or minimized by a damping device 130 operably engaged with a different portion of the elongate hose 114. In such embodiments, relatively sudden changes in disposition of the elongate hose 114 (such as impact forces imparted on the drogue 118 as a second aircraft 120 engages the drogue 118) that may produce, for instance, a fast-moving traveling wave in the elongate hose 114, may be detected immediately and substantially damped before the traveling wave (and the resulting slack that may be developed thereby) is capable of striking (and possibly damaging) a fuselage of the tanker aircraft 110.

The embodiments of the present invention may thus provide a damping device 130 that requires little or no external power supply in order to operate since the transducer (such as a piezoelectric material) may be configured to produce electrical energy (such as a time-varying electrical signal) in response to a change in disposition of the portion of the elongate hose 114 with which it may be operably engaged. As described above, the electrical energy may then be transferred to a control circuit 135 in communication with the transducer that may be energized by the electrical energy and configured to alter the electrical energy such that the altered electrical energy may then be sent back to the transducer disposed in the damping device 130 so as to dampen and/or counteract the change in disposition of the portion of the elongate hose 114 with which the damping device 130 may be operably engaged. Thus, in some embodiments, the damping device 130 may be configured so as to require little or no external power supply from, for instance, the electrical systems of the tanker aircraft 110.

According to other embodiments of the present invention, a controller device 150 may be operably engaged with the damping device 130 (or multiple damping devices 130 (as shown generally in FIG. 1). The controller device 150 may be in communication with the damping device 130 via a wire 140 or other wireless connection and may be capable of storing the generated electrical energy (produced by, for instance, the piezoelectric material disposed within a damping device 130) and selectively transmitting the generated electrical energy to one or more damping devices 130 such that the damping devices 130 may be further capable of exerting the damping force on a portion of the elongate hose 114 that may be experiencing a change in disposition such as an oscillation. The controller device 150 may be carried within a fuselage of the tanker aircraft 110 near the aft end of the tanker aircraft 110 as shown generally in FIG. 1 or in some embodiments, the controller device 150 may be carried within the fuselage of the tanker aircraft 110 at a remote aerial refueling operator (RARO) station located near the flight deck of the tanker aircraft (i.e. near the forward end of the fuselage). The controller device 150 may be connected to a power supply (such as a generator or battery) carried by the tanker aircraft 110 and may also be in communication with one or more control circuits 135 so as to coordinate the transmission of electrical signals to various damping devices 130 that may be operably engaged with the elongate hose 114 so as to dampen and/or minimize a change in disposition (such as an oscillation and/or traveling wave) that may travel from one end of the elongate hose 114 to another as described in more detail above. In some embodiments, the controller device 150 may comprise a computer device and/or other control circuitry such that the controller device 150 may more effectively coordinate the stiffening and/or actuation of the damping device 130 with which it may be in communication. The controller 150 may also comprise a user interface (such as a terminal and/or display) such that an operator of the in-flight refueling system carried by the tanker aircraft 110 may monitor the operation of the damping device 130 and/or override the functions of the damping device 110 in some cases. For instance, the operator may wish to disengage and/or cease operation of the damping device 130 as the elongate hose 114 is being taken up (by, for instance, a roller drum) into a fuselage of the tanker aircraft 110 as the changes in disposition of the elongate hose 114 as it is rolled and/or retracted may activate the damping device 130, causing it to stiffen and/or actuate during the take-up of the elongate hose 114.

In some embodiments, the controller device 150 may also comprise a storage device (such as a capacitor, battery device, or other electronic component) capable of storing the generated electrical energy (produced by, for instance, the piezoelectric material disposed within a damping device 130) and selectively transmitting the generated electrical energy to one or more damping devices 130 such that the damping devices 130 may be further capable of exerting the damping force on a portion of the elongate hose 114 that may be experiencing a change in disposition (such as an oscillation). In such embodiments, the controller device 150 may be capable of switching the damping device 130 to a passive mode (such that the transducers disposed within the damping device 130 may be capable of generating electrical energy from a change in disposition, but may not immediately transmit the energy for the purpose of stiffening and/or actuating the damping device 130 as described above). In such embodiments, while the damping device 130 is in a passive mode, the controller device 150 may be capable of storing electrical energy that may be generated by the piezoelectric material (or other transducers) disposed in the damping device 130 as the elongate hose 114 is either extended or retracted. Thus, at least some portion of the energy required to actuate the elongate hose 114 take-up mechanism (such as, for instance, an automated drum roller) may be converted from mechanical changes in disposition to electrical energy that may later be used to power the damping device 130 as described in detail above.

Referring again to FIGS. 1 and 2, a method for facilitating the stabilization of an elongate hose 114 having a first end carried by a tanker aircraft 110 and an opposing second end (operably engaged with a drogue 118) configured to extend from the tanker aircraft 110 is described. According to some embodiments, the method may comprise the steps of: detecting a change in disposition of a portion of the elongate hose 114 (via, for instance, a damping device 130 comprising a piezoelectric material); and stiffening the portion of the elongate hose 114 in response to the detected change in disposition of the portion of the elongate hose, thereby resisting the change in disposition of the portion of the elongate hose 114 in response to a force exerted on the elongate hose 114. According to some embodiments, the stiffening step may occur via the actuation of piezoelectric materials provided as part of a damping device 130 that may be operably engaged with the portion of the elongate hose 114 (as described in more detail above).

According to some other embodiments, the detecting step may further comprise generating electrical energy (via for instance the damping device 130 and transducers included therein) from the change in disposition of the portion of the elongate hose 114. In addition, the stiffening step may further comprise converting the generated electrical energy into a damping force to be exerted on the portion of the elongate hose 114 (via a damping device 130) so as to resist the change in disposition of the portion of the elongate hose 114. In other embodiments of the present invention, the method may further comprise the step of storing the generated electrical energy from the change in disposition of the elongate hose 114 such that the electrical energy may be selectively transmitted to the damping device 130 when necessary to dampen and/or counteract a change in the disposition of a portion of the elongate hose 114 with which the damping device 130 may be operably engaged.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An in-flight refueling system comprising:

a tanker aircraft;

an elongate hose having a first end carried by the tanker aircraft and an opposing second end configured to extend from the tanker aircraft; and a damping device operably engaged with a portion of the elongate hose and capable of stiffening in response to a change in disposition of the portion of the elongate hose, thereby resisting the change in disposition of the portion of the elongate hose in response to a force exerted thereon.

2. An in-flight refueling system according to claim 1, wherein the damping device comprises a transducer capable of generating electrical energy in response to the change in disposition, the damping device further comprising a stiffening element capable of converting the generated electrical energy into a damping force to be exerted on the portion of the elongate hose so as to resist the change in disposition of the portion of the elongate hose.

3. An in-flight refueling system according to claim 1, wherein the damping device comprises material selected from the group consisting of:

piezoelectric material;

piezoelectric fiber;

polyvinylidene fluoride (PVDF); and combinations thereof.

4. An in-flight refueling system according to claim 1, wherein the damping device is integrated into the elongate hose.

5. An in-flight refueling system according to claim 2, further comprising a controller device operably engaged with the damping device, the controller device being capable of storing the generated electrical energy and transmitting the generated electrical energy to the damping device such that the damping device is capable of exerting the damping force on the portion of the elongate hose.

6. An in-flight refueling system adapted to be carried by a tanker aircraft, comprising:

an elongate hose having a first end carried by the tanker aircraft and an opposing second end configured to extend from the tanker aircraft; and a damping device operably engaged with a portion of the elongate hose and capable of stiffening in response to a change in disposition of the portion of the elongate hose, thereby resisting the change in disposition of the portion of the elongate hose in response to a force exerted thereon.

7. An in-flight refueling system according to claim 6, wherein the damping device comprises a transducer capable of generating electrical energy in response to the change in disposition, the damping device further comprising a stiffening element capable of converting the generated electrical energy into a damping force to be exerted on the portion of the elongate hose so as to resist the change in disposition of the portion of the elongate hose.

8. An in-flight refueling system according to claim 6, wherein the damping device comprises material selected from the group consisting of:

piezoelectric material;
piezoelectric fiber;
polyvinylidene fluoride (PVDF); and
combinations thereof.

9. An in-flight refueling system according to claim 6, wherein the damping device is integrated into the elongate hose.

10. An in-flight refueling system according to claim 7, further comprising a controller device operably engaged with the damping device, the controller device being capable of storing the generated electrical energy and transmitting the generated electrical energy to the damping device such that the damping device is capable of exerting the damping force on the portion of the elongate hose.

11. A damping device adapted to be operably engaged with a portion of an elongate hose, the elongate hose having a first end carried by a tanker aircraft and an opposing second end configured to extend from the tanker aircraft, the damping device being configured to be capable of stiffening in response to a change in disposition of the portion of the elongate hose, thereby resisting the change in disposition of the portion of the elongate hose in response to a force exerted thereon.

12. A damping device according to claim 11, wherein the damping device comprises a transducer capable of generating electrical energy in response to the change in disposition, the damping device further comprising a stiffening element capable of converting the generated electrical energy into a damping force to be exerted on the portion of the elongate hose so as to resist the change in disposition of the portion of the elongate hose.

13. A damping device according to claim 11, comprising a material selected from the group consisting of:

piezoelectric material;
piezoelectric fiber;
polyvinylidene fluoride (PVDF); and
combinations thereof.

14. A damping device according to claim 11, wherein the damping device is integrated into the elongate hose.

15. A damping device according to claim 12, further comprising:

a piezoelectric transducer;
a controller device operably engaged with the piezoelectric transducer, the controller device being configured to be capable of storing the generated electrical energy and transmitting the generated electrical energy to the piezoelectric transducer such that the piezoelectric transducer is capable of exerting the damping force on the portion of the elongate hose.

16. A method for facilitating the stabilization of an elongate hose having a first end carried by a tanker aircraft and an opposing second end configured to extend from the tanker aircraft, the method comprising:

detecting a change in disposition of a portion of the elongate hose; and
stiffening the portion of the elongate hose in response to the detected change in disposition of the portion of the elongate hose, thereby resisting the change in disposition of the portion of the elongate hose in response to a force exerted thereon.

17. A method according to claim 16, wherein detecting the change in disposition comprises generating electrical energy from the change in disposition of the portion of the elongate hose and wherein stiffening the portion of the elongate hose comprises converting the generated electrical energy into a damping force to be exerted on the portion of the elongate hose so as to resist the change in disposition of the portion of the elongate hose.

18. A method according to claim 17, further comprising storing the generated electrical energy from the change in disposition.

* * * * *